United States Patent
Duffy

(10) Patent No.: US 12,377,897 B2
(45) Date of Patent: Aug. 5, 2025

(54) BRAKING APPARATUS FOR HAND TRUCKS

(71) Applicant: Thomas Duffy, Chandler, AZ (US)

(72) Inventor: Thomas Duffy, Chandler, AZ (US)

(*) Notice: Subject to any disclaimer, the term of this patent is extended or adjusted under 35 U.S.C. 154(b) by 520 days.

(21) Appl. No.: 17/706,322

(22) Filed: Mar. 28, 2022

(65) Prior Publication Data

US 2023/0303148 A1  Sep. 28, 2023

(51) Int. Cl.
*B62B 5/04* (2006.01)
*B62B 1/00* (2006.01)

(52) U.S. Cl.
CPC .......... *B62B 5/0433* (2013.01); *B62B 5/0485* (2013.01); *B62B 1/002* (2013.01)

(58) Field of Classification Search
CPC ..... B62B 3/1472; B62B 1/002; B62B 5/0433; B62B 5/0485
See application file for complete search history.

(56) References Cited

U.S. PATENT DOCUMENTS

| | | | | |
|---|---|---|---|---|
| 2,747,692 A * | 5/1956 | Holmes | ................... | B62B 5/049 |
| | | | | 74/521 |
| 5,035,445 A * | 7/1991 | Poulin | ..................... | B60T 1/14 |
| | | | | 280/79.11 |
| 7,757,819 B2 * | 7/2010 | Chen | ...................... | B62B 9/082 |
| | | | | 280/647 |
| 9,079,599 B1 * | 7/2015 | Ralls | ...................... | B62B 1/264 |
| 9,950,729 B2 * | 4/2018 | Choi | ....................... | B62B 3/007 |
| 11,136,054 B1 * | 10/2021 | Taylor | ..................... | B62B 1/14 |
| 2003/0038439 A1 * | 2/2003 | Novak | .................. | B62B 5/049 |
| | | | | 280/79.7 |
| 2012/0114454 A1 * | 5/2012 | Stransky | ................. | B62B 1/145 |
| | | | | 414/490 |
| 2017/0210406 A1 * | 7/2017 | Biesinger | ................ | B62B 5/067 |
| 2021/0094600 A1 * | 4/2021 | Brunner | ............... | B62B 5/0433 |

OTHER PUBLICATIONS

AU 2021206922 A1 (Year: 2021).*
CN 208745656 U (Year: 2019).*
CN 209529622 U (Year: 2019).*

* cited by examiner

*Primary Examiner* — Robert A. Siconolfi
*Assistant Examiner* — Mahbubur Rashid
(74) *Attorney, Agent, or Firm* — Barry Choobin; Patent 360

(57) ABSTRACT

A braking apparatus for a hand truck that keeps the hand truck stable while lifting or dropping a load from the hand truck. The braking apparatus includes a lever and clamps for pivotally mounting the lever to an axle of the hand truck, and a recoiling mechanism that allows the lever to switch between a deployed position and a non-interfering position. The operator can press the lever against the floor to prevent the rolling of the hand truck while loading.

9 Claims, 13 Drawing Sheets

BRAKING APPARATUS FOR HAND TRUCKS

FIELD OF INVENTION

The present invention relates to a braking apparatus for hand trucks, and more particularly, the present invention relates to a braking apparatus that can retrofit to a hand truck and save an operator of the hand truck from injury.

BACKGROUND

Hand trucks are well known in the art as mechanical devices used for transporting loads from one place to another. Hand trucks make the process of lifting and carrying a load easier and less laborious. However, transporting heavy loads using hand trucks often results in a backward force that is typically counteracted by the operator who places his foot on the axle of the hand truck to prevent rollback. Such a maneuver by the operator is difficult requiring the operator to be close to the rotational axis of the hand truck. Moreover, the body posture results in undue stress on the user's back and can often lead to a severe injury. Wheel braking mechanisms for hand trucks are known in the art, however, the known mechanisms tend to break the wheels of the hand truck and occupy the hands of the operator for applying the brakes, both the drawbacks of known braking mechanism for hand trucks are undesired in lifting heavy loads.

Thus, considering the popularity of hand trucks and to keep the hand truck in control without undue pressure on the operator, an industrial need is appreciated for a novel braking mechanism for hand trucks.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a braking apparatus for hand trucks that prevent the rollback of the hand truck while lifting loads.

It is another object of the present invention that the body posture of the operator can be normal with a balanced center of gravity while braking.

It is still another object of the present invention that the braking apparatus allows keeping a better control on the hand truck while lifting and dropping heavy loads.

It is yet another object of the present invention that braking can be less stressful.

It is a further object of the present invention that the braking apparatus can retrofit to a conventional hand truck.

It is still a further object of the present invention that the braking apparatus can be removed.

It is yet a further object of the present invention that the braking apparatus is economical to manufacture.

It is an additional object of the present invention that the braking apparatus makes the operation of the hand truck safer.

It is still an additional object of the present invention that the braking apparatus is versatile in installation and use.

It is yet an additional object of the present invention that the braking apparatus can help prevent accidental drop of heavy load.

In one aspect, disclosed is a braking apparatus for a hand truck, the braking apparatus comprises a lever of an elongated and planar profile, the lever has a proximal end and a distal end; the proximal end configured to be pivotally coupled to an axle of the hand truck; and a recoiling member that extends between the lever and a frame of the hand truck, wherein the recoiling member is configured to pivot the lever from a deployed position to an upright non-interfering position. The braking apparatus further comprises a plurality of clamps, wherein the axle is sandwiched between the plurality of clamps and the lever. Each of the plurality of clamps comprises a concave recess, the lever comprises a plurality of concave recesses, the axle is tubular, wherein the axle is sandwiched between the concave recess of the each of the plurality of clamps and the plurality of concave recesses in the lever. The braking apparatus further comprises a plurality of apertures in the lever, and the recoiling member comprises an elastic cord configured to loop through two or more of the plurality of apertures and fasten to the frame of the hand truck. The proximal end is pivotally coupled to the axle using a pair of zip ties.

In one aspect, disclosed is a hand truck comprising a braking apparatus, the braking apparatus comprises a lever of an elongated and planar profile, the lever has a proximal end and a distal end; the proximal end configured to be pivotally coupled to an axle of the hand truck; and a recoiling member that extends between the lever and a frame of the hand truck, wherein the recoiling member is configured to pivot the lever from a deployed position to an upright non-interfering position.

In one aspect, disclosed is a method for stabilizing a hand truck while lifting and dropping a load, the method comprising the steps of providing a braking apparatus comprising a lever of an elongated and planar profile, the lever has a proximal end and a distal end; the proximal end configured to be pivotally coupled to an axle of the hand truck; and a recoiling member that extends between the lever and a frame of the hand truck, wherein the recoiling member is configured to pivot the lever from a deployed position to an upright non-interfering position.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 7:
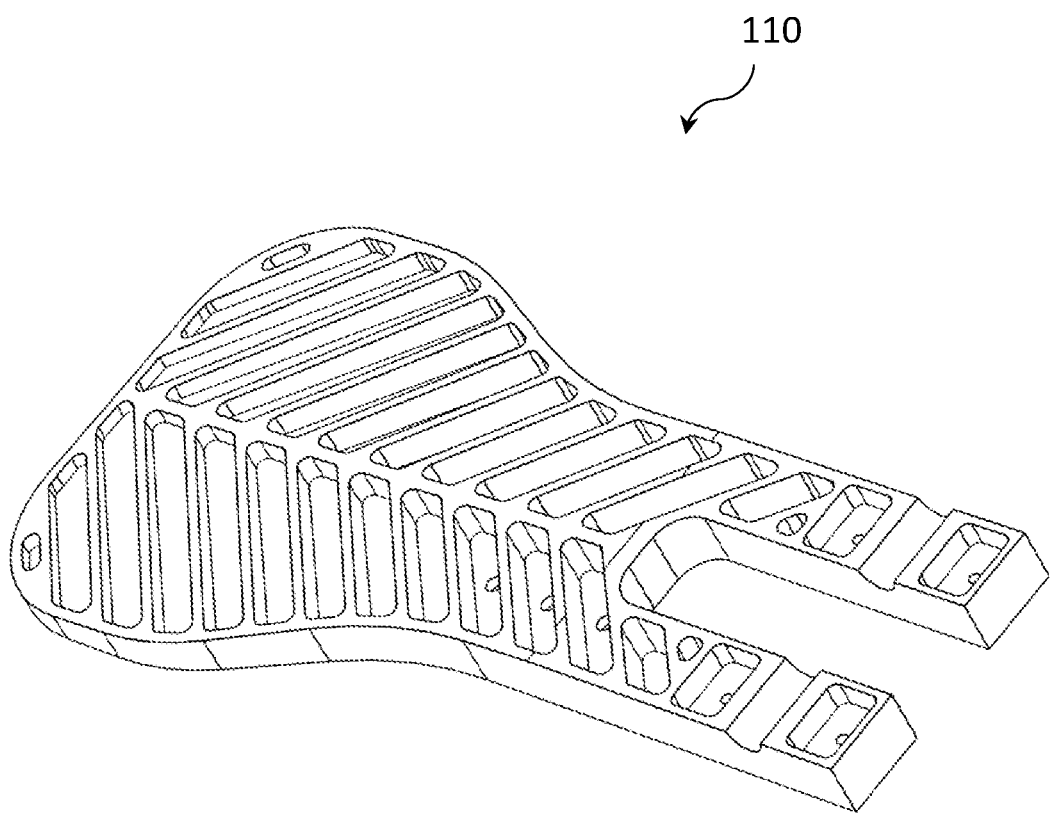
FIG. 7 shows the braking apparatus without clamps, according to an exemplary embodiment of the present invention.
Figure 8:
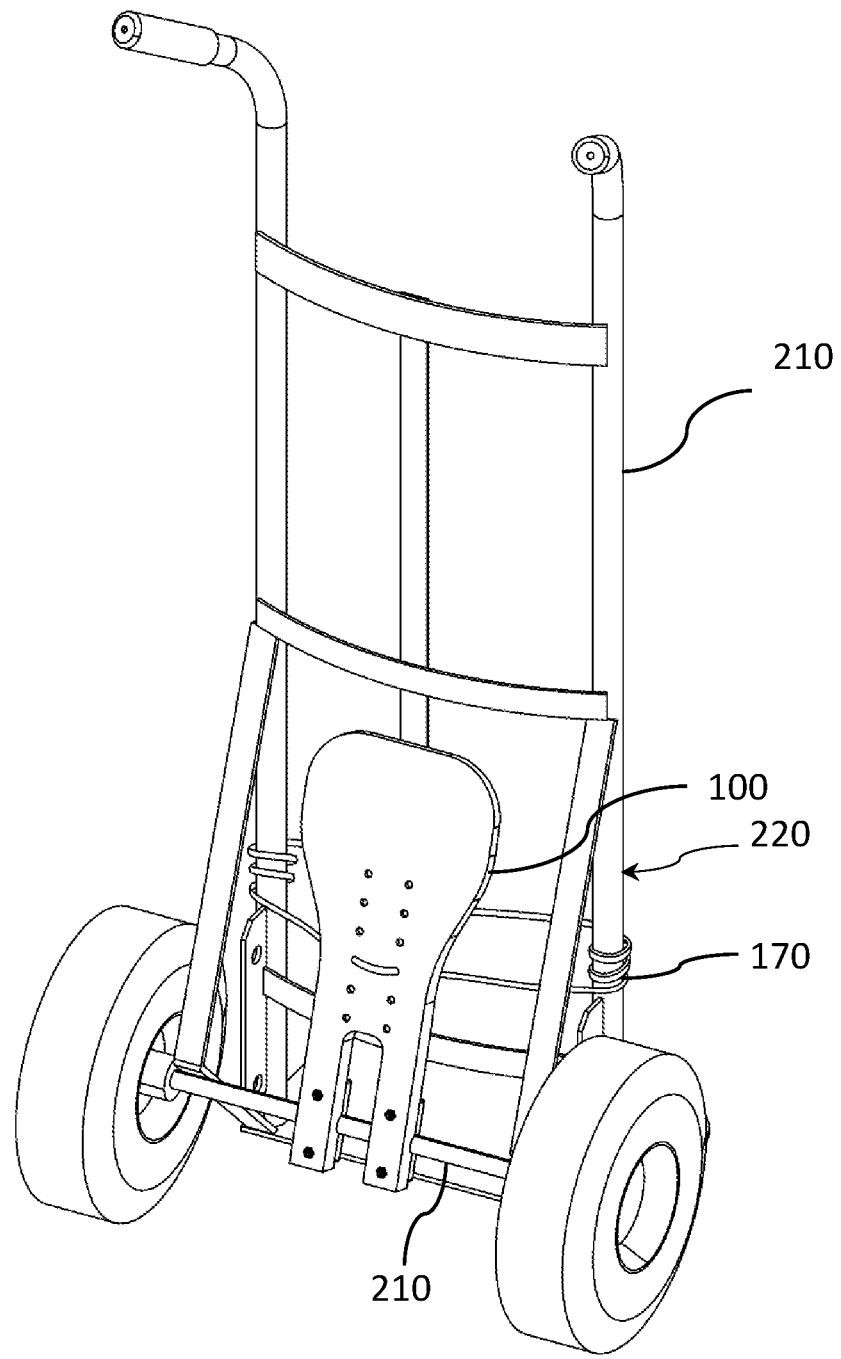
FIG. 8 shows an elastic cord coupling the braking apparatus to a frame of the hand truck, according to an exemplary embodiment of the present invention.
Figure 9:
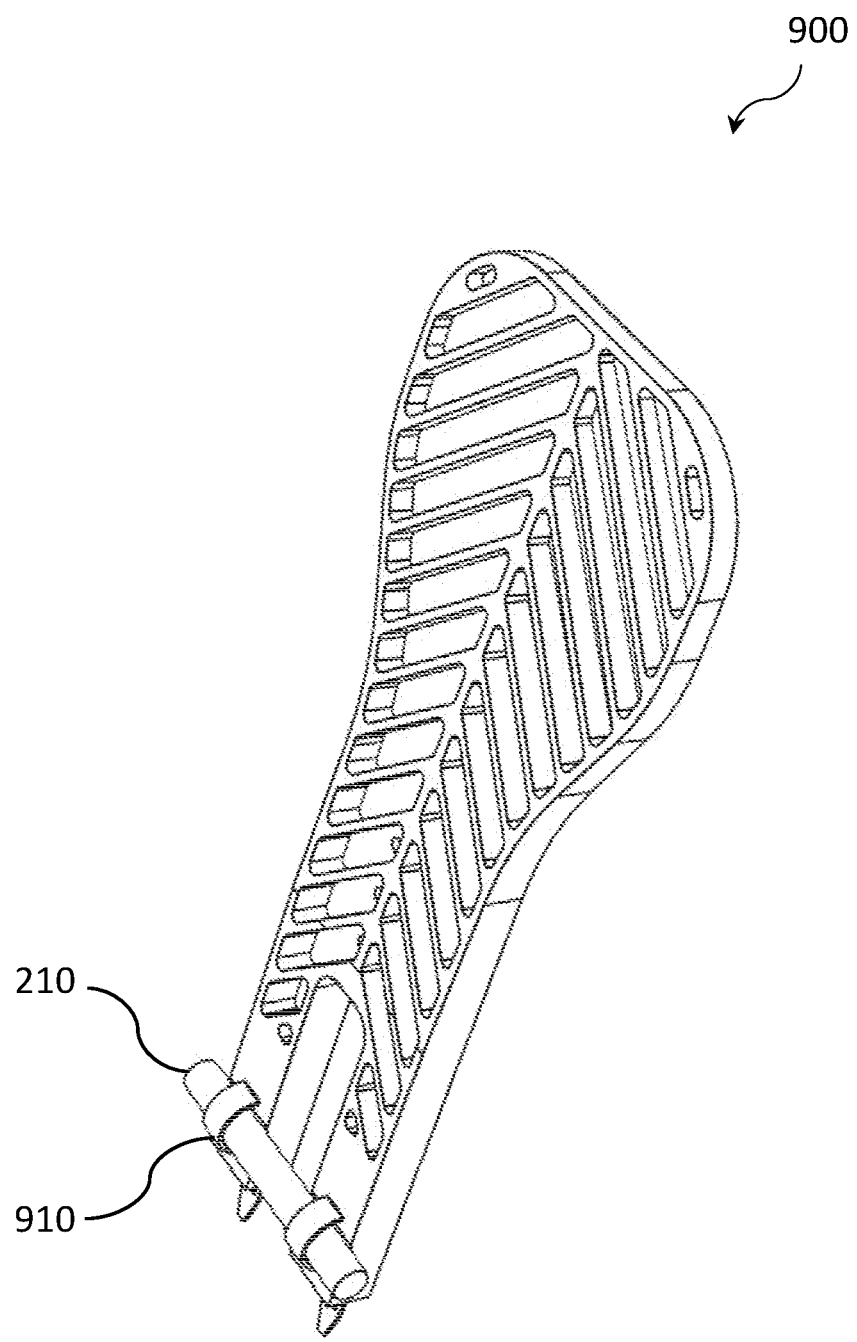
FIG. 9 is a perspective view of another embodiment of the braking apparatus shown mounted to an axle of the hand truck using a pair of cable ties, according to an exemplary embodiment of the present invention.
Figure 10:
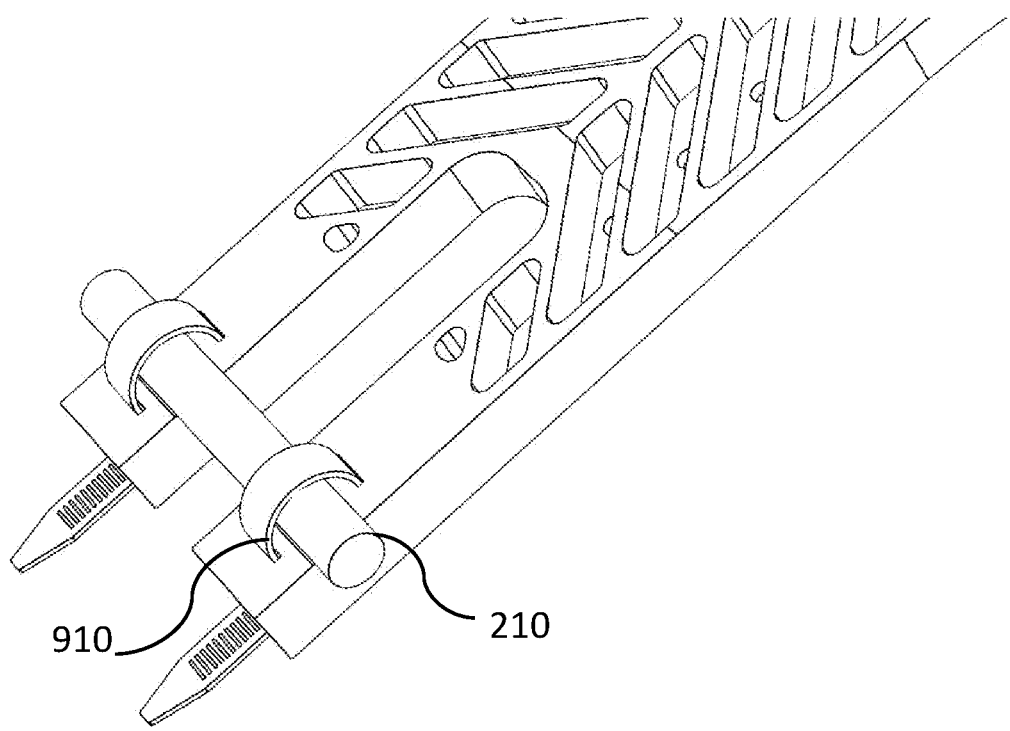
FIG. 10 is an enlarged view of a portion of the braking apparatus shown in FIG. 9, according to an exemplary embodiment of the present invention.

Disclosed is a braking apparatus for hand trucks that allows better control over handling of the hand trucks while lifting or dropping heavy loads from the hand trucks. The braking apparatus can retrofit to an axle of a conventional hand truck. Referring to FIGS. 1-8, FIG. 1 shows the braking apparatus 100 mounted to a hand truck 200, FIGS. 2-6 show different views of the disclosed braking apparatus 100, FIG. 7 shows the lever of the braking apparatus, and FIG. 8 shows the braking apparatus in a folded state and a recoiling member.

The braking apparatus can include an elongated planar lever 110 having a proximal end and a distal end. The length of the lever 110 can be at least a length of an adult shoe, such that an operator can comfortably and firmly place his foot on the lever pressed upon the ground. The proximal end of the lever 110 can be mounted to an axle 210 of the hand truck 200 and the distal end of the lever 110 can rest on the ground when pressed by the operator. It is understood that the lever has been described to be planar, however, the lever can be slightly curved without departing from the scope of the present invention. The lever can be made from any rigid and durable material, such as metals, plastics, and alloys.

The proximal end of the lever 110 can have clamps 120 coupled to the lever 110. The clamps 120 can be fastened to the proximal end of the lever 110 through fasteners 130. The fasteners shown in the drawings are nuts and bolts, however, any different fastener is within the scope of the present invention. Moreover, the drawings show two clamps coupled to the lever, however, one or more clamps are within the scope of the present invention. The clamps 120 can engage to the axle 210 of the hand truck 200 wherein a bottom of the clamp can have a substantially concave recess that overlay to the axle. Similarly, a concave recess 140 can be provided at the proximal end of the lever 110. The axle of the hand truck can be sandwiched between the concave recesses of the clamps and the lever, and thereafter, the clamps can be secured to the lever through the fasteners. The fasteners can be tightened to mount the apparatus to the axle. Similarly, the fasteners can be loosened to uninstall the apparatus from the axle. The clamps can have sufficient free play that allows mounting the clamp to distinct sizes axles of the hand trucks without undesired wobbling of the apparatus. Moreover, clamps of varied sizes, i.e., having different size recesses can be provided that can be interchangeably used. The axle is an essential part of a hand truck and thus, the disclosed braking apparatus can retrofit to most of the conventional hand trucks without any modifications to the hand truck. The lever can freely pivot relative to the axle at the clamping points.

To mount the disclosed braking apparatus to a hand truck, the proximal end of the lever can be bought under the axle of the hand truck and then the clamp can be mounted over the axle. The clamp can be mounted such that the recess of the clamp overlay the axle and the clamp can then be fastened to the lever through fasteners. Two clamps can provide stability to the braking apparatus, however, more than one clamp is within the scope of the present invention. Moreover, a different clamping mechanism known to a skilled person for mounting a planar structure to a tubular structure can also be used, and all such clamping mechanisms are within the scope of the present invention.

The top surface of the lever over which the foot of the operator is to be placed, for applying the brakes, can have ridges to prevent the foot from skidding. The ridges can be integral to the lever or can be bonded to the lever. Instead of ridges, through-holes can also be provided for the anti-skid surface. The drawings show elongated through holes 150 in two rows running between the proximal and the distal end.

Figure 1:
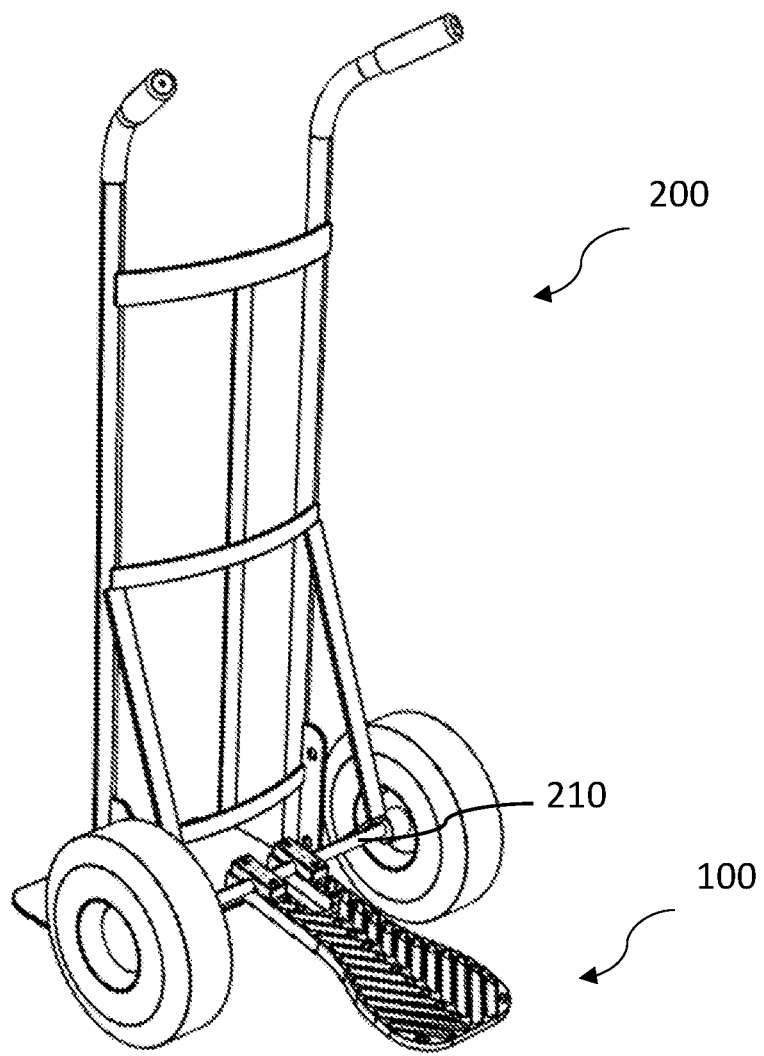
FIG. 1 shows a braking apparatus mounted to a hand truck, according to an exemplary embodiment of the present invention.
Figure 2:
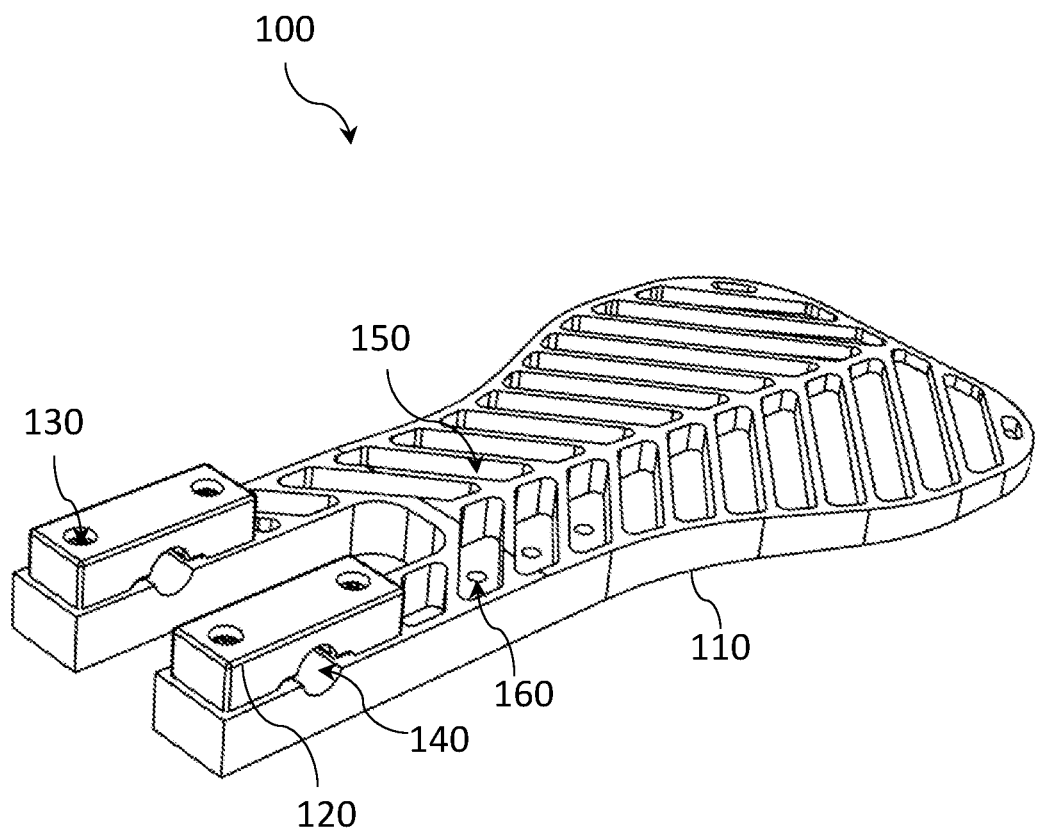
FIG. 2 is a perspective view of the braking apparatus, according to an exemplary embodiment of the present invention.
Figure 3:
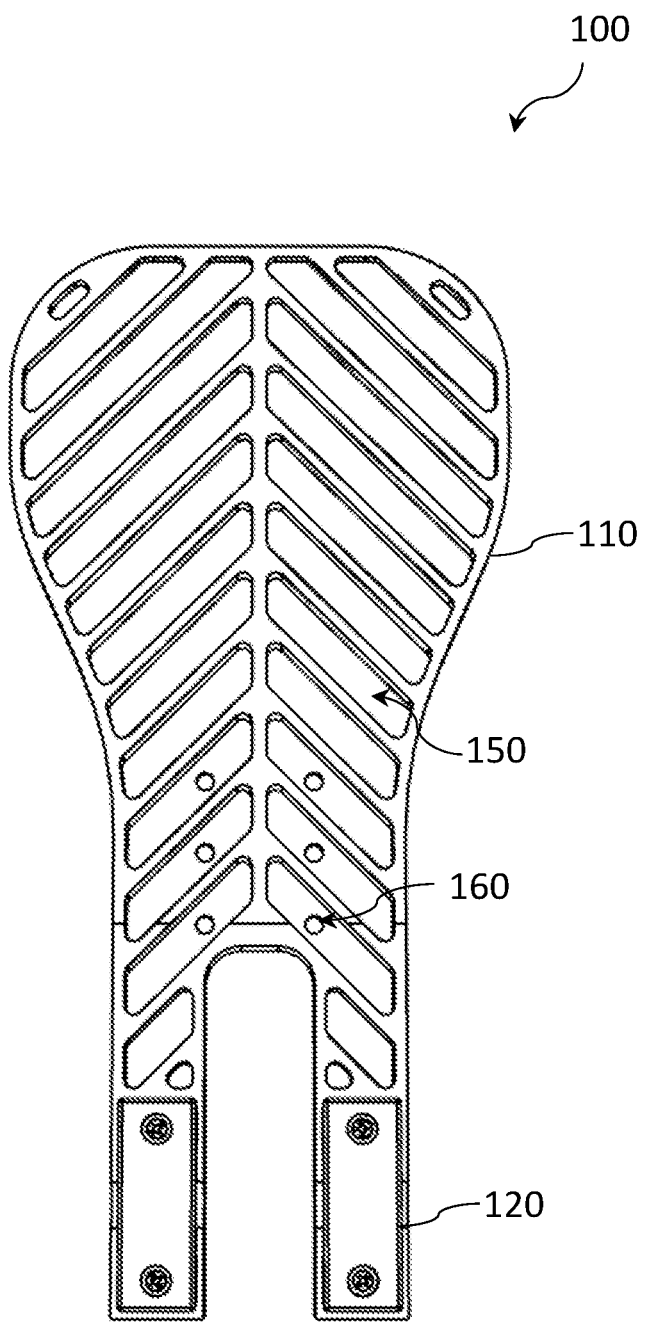
FIG. 3 is a top view of the braking apparatus, according to an exemplary embodiment of the present invention.
Figure 4:
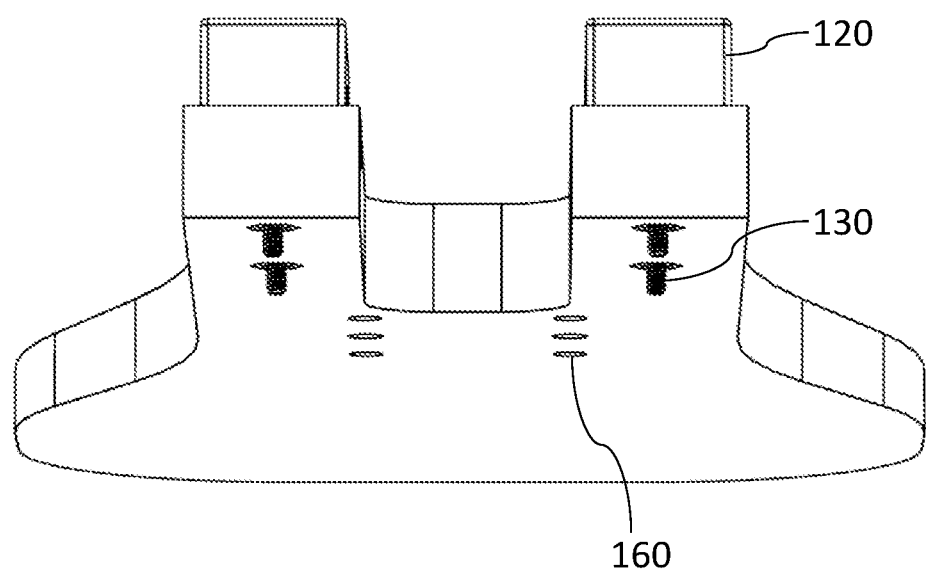
FIG. 4 is a bottom perspective view of the braking apparatus, according to an exemplary embodiment of the present invention.
Figure 5:
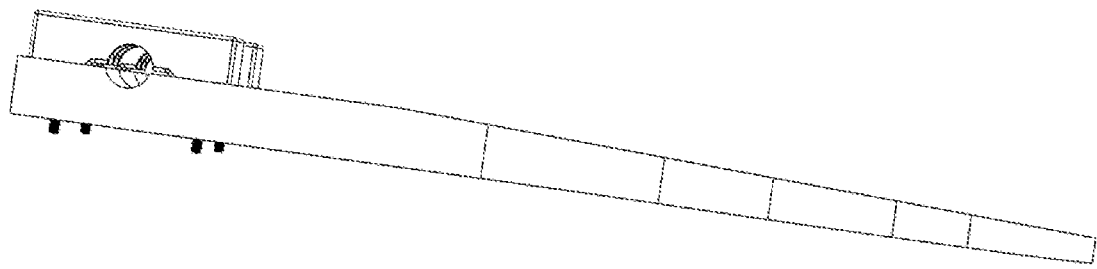
FIG. 5 is a side view of the braking apparatus, according to an exemplary embodiment of the present invention.
Figure 6:
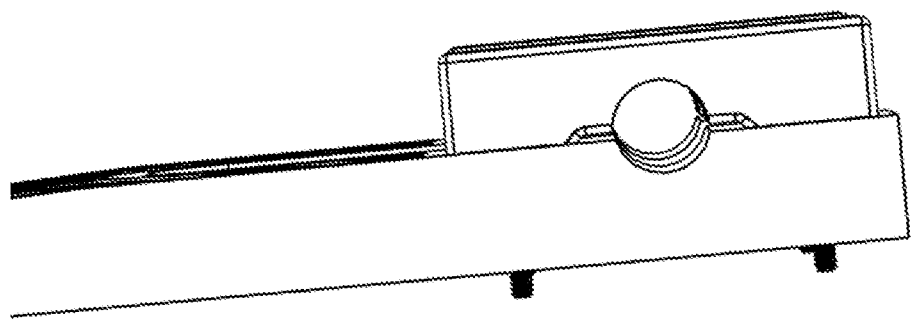
FIG. 6 is an enlarged side view of the braking apparatus, according to an exemplary embodiment of the present invention.

Referring to FIG. 2, which shows several apertures 160 in the lever. A recoil member can be provided for switching the lever between a deployed position and a non-interfering position. Near the proximal end of the lever can be provided several consecutive apertures 160. The apertures can be more clearly seen in FIG. 3, wherein two rows of apertures spaced apart from each other run parallel to each other and along the length of the lever. Referring to FIG. 8 which shows an elastic cord 170, such as a bungee cord that can loop through two or more apertures and can be fastened to a frame 220 of the hand truck 200. The elastic cord can keep the lever in the non-interfering position i.e., upright. To deploy the lever, the operator can pull down the lever with his hand or foot, and then press the lever against the floor with his foot to keep the hand truck stable, such as during the loading and unloading of the hand truck. The operator can firmly keep his foot on the lever without compromising the balance of gravity of the body while lifting or dropping a heavy load to and from the hand truck. The operator can remain in a normal body posture while pressing the lever against the floor. To release the brakes, the operator can simply move away the foot from the lever, wherein the recoiling mechanism of the elastic cord can pull the lever back from the deployed position to the non-interfering position.

The elastic cord can be fastened to the row of apertures by tying loops in the elastic cord and treading it through the series of consecutive apertures. The same elastic cord can be extended through the two opposite rows of apertures, or two elastic cords can be used for two rows. The elastic cord can then be wrapped around the supporting structures of the hand truck. For example, the elastic cord can be fastened to the frame of the hand truck using butterfly locks. The bungee cord allows for extreme adjustability, wherein several bungee tie points are available to adjust the recoil tension and the speed of recoil. Screw/Bolt connections of the clamps with nylon locking nuts can provide adjustability of frictional resistance to the recoil mechanism. Thus, the disclosed assembly may freely pivot relative to the axle, or a small amount of friction can be induced between the clamps and the axle to prevent abrupt recoiling of the lever. It is understood, however, that the movement of the lever relative to the axle can be slowed down using any other mechanism without departing from the scope of the present invention.

The disclosed apparatus can have the advantage that the load can be lifted in a more controlled manner, but also, lowering the load can be done slowly with precision eliminating fast dropping of the load. This can prevent damage to sensitive flooring/walls and any other obstructions.

Figure 11:
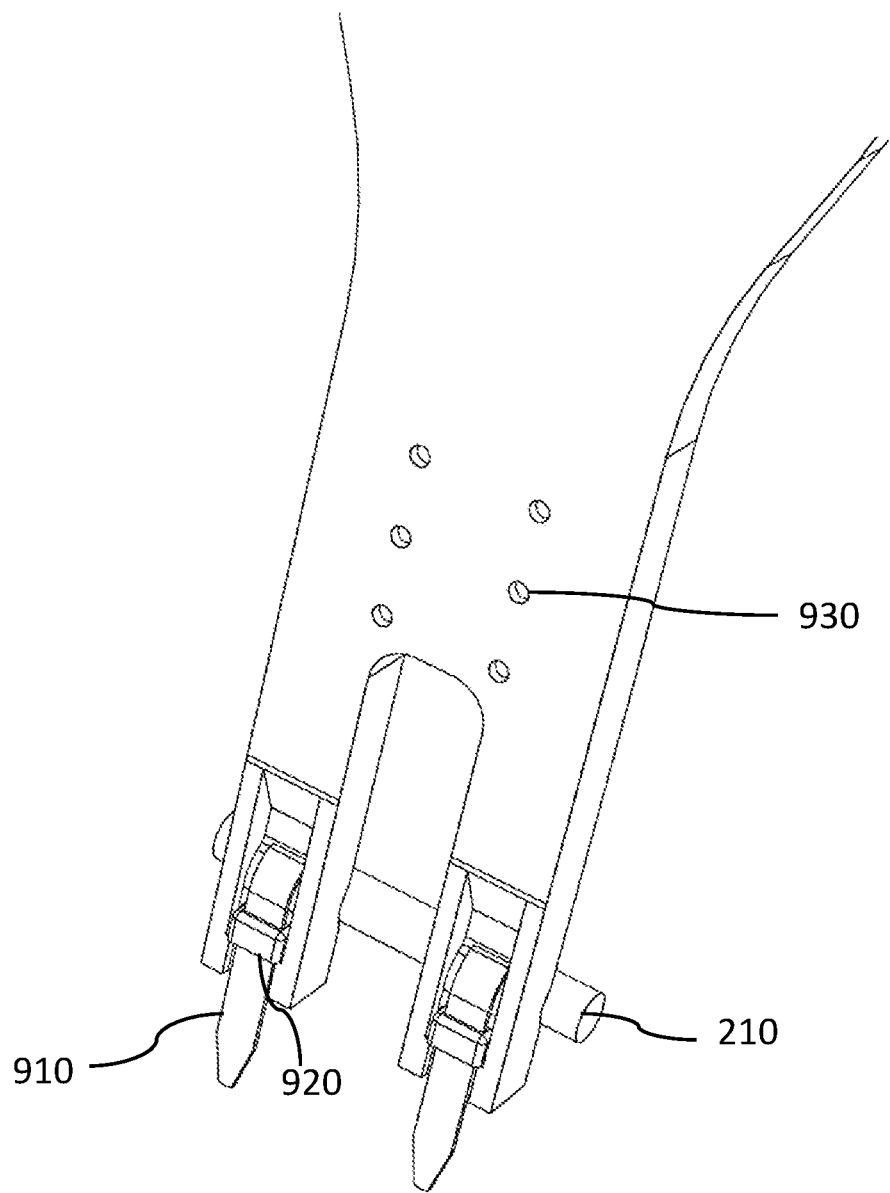
FIG. 11 is a rear view of the portion of the braking apparatus shown in FIG. 10, according to an exemplary embodiment of the present invention.
Figure 12:
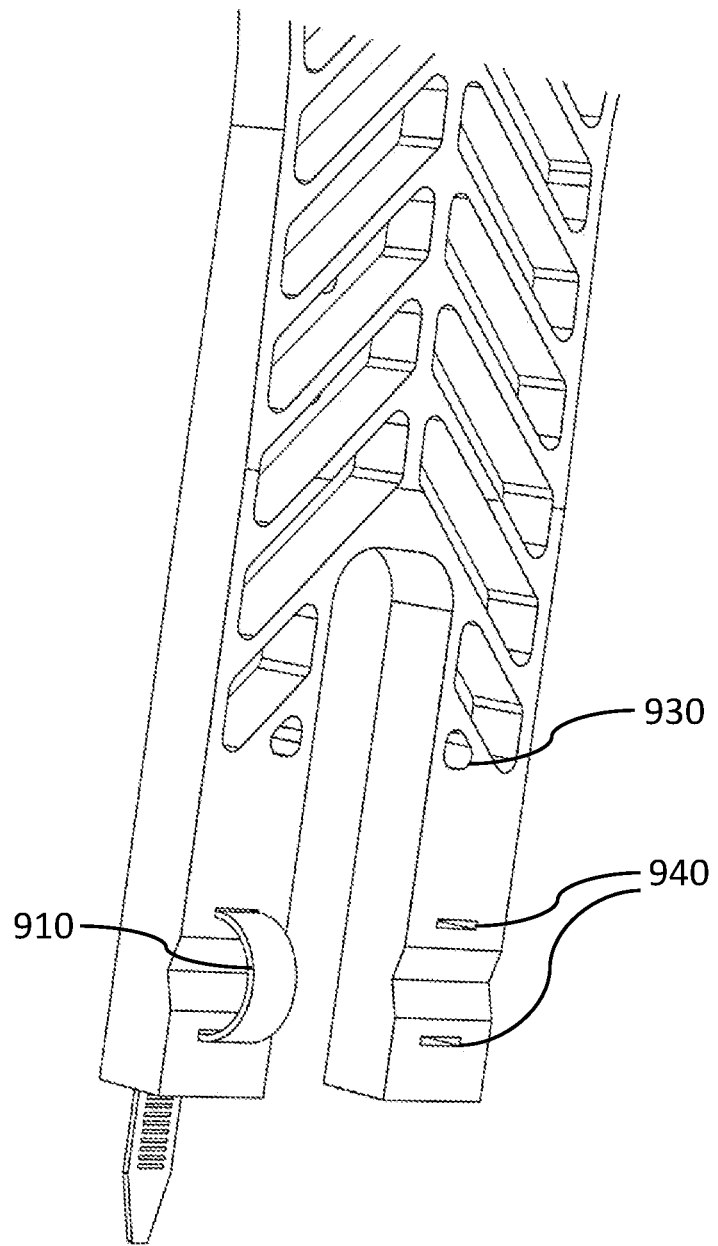
FIG. 12 is an enlarged view of the braking apparatus in which one of the zip-ties is removed to show the V-shape slots for passing through zip tie, according to an exemplary embodiment of the present invention.
Figure 13:
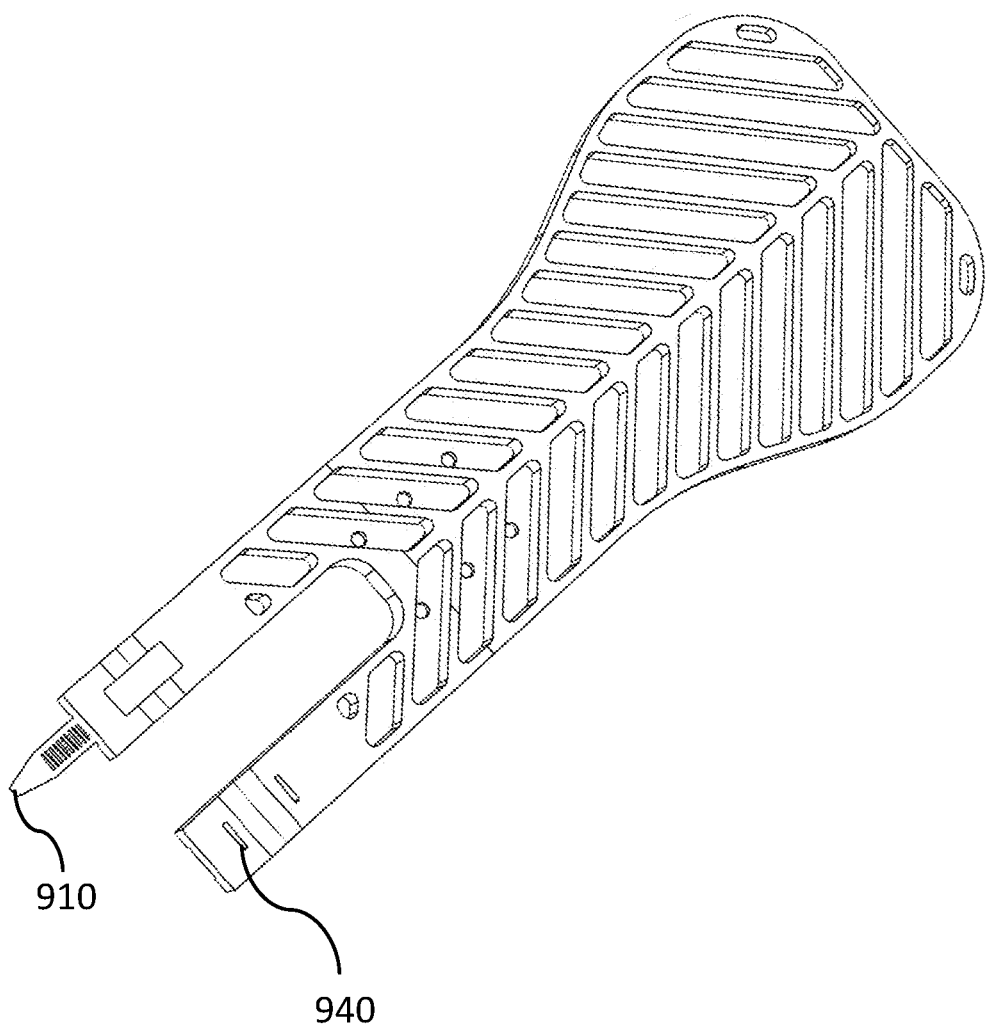
FIG. 13 is another view of the braking apparatus shown in FIG. 12, according to an exemplary embodiment of the present invention.

Referring to FIGS. 9-13 which show another exemplary embodiment of the braking apparatus 900. The braking apparatus has a pair of zip ties 910 that can be used to secure the proximal end of the lever to the axle 210 of the hand truck. The use of zip ties makes it easy to accommodate to the diverse size axles of the hand truck. Moreover, the zip ties are easy and quick to install, and may not require any tools, such as a wrench used to tighten nuts and bolts type of fasteners. FIG. 12 shows the two V-shape elongated slots 940 that are spaced apart and parallel to each other. The tip of the zip tie can consecutively pass through the two spaced-apart V-slots and wrap the axle of the hand truck. The tip of the zip tie can then pass through the lock 920 to secure the brake apparatus to the axle. FIG. 11 also shows the apertures 930 for the elastic cord.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A braking apparatus for a hand truck, the braking apparatus comprises:
    a lever of an elongated and planar profile, the lever has a proximal end and a distal end;
    the proximal end configured to be pivotally coupled to an axle of the hand truck; and
    a recoiling member that extends between the lever and a frame of the hand truck, wherein the recoiling member is configured to pivot the lever from a deployed position to an upright non-interfering position, wherein the lever has a pair of rows of apertures running parallel to each other, each row having a plurality of apertures,
    wherein the proximal end is pivotally coupled to the axle using a pair of zip ties, wherein the lever comprises two pair of elongated V-shape holes for the pair of zip ties to pass through, wherein each pair of the elongated V-shape holes comprises two V-shaped elongated slots that are spaced apart from each other and run parallel.

2. The braking apparatus according to claim 1, wherein the recoiling member comprises an elastic cord configured to loop through two or more of the plurality of apertures and wrap around the frame of the hand truck.

3. The braking apparatus according to claim 2, wherein the elastic cord loops through a series of consecutive apertures of the plurality of apertures in each of the pair of rows of apertures.

4. The braking apparatus according to claim 1, wherein the recoiling member comprises two elastic cords, a first elastic cord loops through a series of consecutive apertures of the plurality of apertures in a first row of the pair of rows of apertures, and a second elastic cord loops through a series of consecutive apertures of the plurality of apertures in a second row of the pair of rows of apertures.

5. The braking apparatus of claim 1, wherein each aperture of the pair of rows of apertures are within elongated cavities in the lever, wherein one elongated cavity has one aperture of the pair of rows of apertures.

6. A hand truck comprising:
    a braking apparatus, the braking apparatus comprises:
        a lever of an elongated and planar profile, the lever has a proximal end and a distal end;
        the proximal end is configured to be pivotally coupled to an axle of the hand truck; and
        a recoiling member that extends between the lever and a frame of the hand truck, wherein the recoiling member is configured to pivot the lever from a deployed position to an upright non-interfering position, wherein the lever has a pair of rows of apertures running parallel to each other, each row having a plurality of apertures,
        wherein the proximal end is pivotally coupled to the axle using a pair of zip ties, wherein the lever comprises two pair of elongated V-shape holes for the pair of zip ties to pass through, wherein each pair of the elongated V-shape holes comprises two V-shaped elongated slots that are spaced apart from each other and run parallel.

7. The hand truck according to claim 6, wherein the recoiling member comprises an elastic cord configured to loop through two or more of the plurality of apertures and wrap around the frame of the hand truck.

8. A method for stabilizing a hand truck while lifting and dropping a load, the method comprising:
  providing a braking apparatus comprising:
    a lever of an elongated and planar profile, the lever has a proximal end and a distal end;
    the proximal end configured to be pivotally coupled to an axle of the hand truck; and
    a recoiling member that extends between the lever and a frame of the hand truck, wherein the recoiling member is configured to pivot the lever from a deployed position to an upright non-interfering position, wherein the lever has a pair of rows of apertures running parallel to each other, each row having a plurality of apertures,
  wherein the proximal end is pivotally coupled to the axle using a pair of zip ties, wherein the lever comprises two pair of elongated V-shape holes for the pair of zip ties to pass through, wherein each pair of the elongated V-shape holes comprises two V-shaped elongated slots that are spaced apart from each other and run parallel.

9. The method according to claim 8, wherein the recoiling member comprises an elastic cord configured to loop through two or more of the plurality of apertures and wrap around the frame of the hand truck.

\* \* \* \* \*